United States Patent [19]
Ledingham

[11] Patent Number: 6,053,654
[45] Date of Patent: Apr. 25, 2000

[54] SPLICE SLEEVE FOR GUIDE RAILS

[75] Inventor: Stuart J. Ledingham, Coto de Caza, Calif.

[73] Assignee: Valu Engineering, Inc., Irvine, Calif.

[21] Appl. No.: 09/172,818

[22] Filed: Oct. 15, 1998

Related U.S. Application Data

[63] Continuation-in-part of application No. 08/934,861, Sep. 22, 1997.

[51] Int. Cl.[7] .................................................... F16B 2/06
[52] U.S. Cl. ...................... 403/306; 403/312; 403/374.3; 198/836.1; 198/836.3
[58] Field of Search .................................... 403/306, 309, 403/310, 312, 373, 374.3; 198/836.1, 836.3

[56] References Cited

U.S. PATENT DOCUMENTS

| | | |
|---|---|---|
| 229,670 | 7/1880 | Carrick . |
| 930,870 | 8/1909 | Lewis . |
| 3,059,589 | 10/1962 | Schreyer . |
| 4,958,725 | 9/1990 | Meade et al. ......................... 198/836.1 |
| 5,492,218 | 2/1996 | Falkowski ............................ 198/836.3 |
| 5,533,826 | 7/1996 | Cairns .............................. 198/836.3 X |
| 5,626,221 | 5/1997 | Ledingham .......................... 198/836.3 |
| 5,676,239 | 10/1997 | Mason ................................. 198/836.1 |
| 5,701,991 | 12/1997 | Helmetsie ............................ 198/836.3 |
| 5,782,339 | 7/1998 | Drewitz .............................. 198/836.3 |
| 5,803,687 | 9/1998 | Ledingham ...................... 198/836.3 X |
| 5,896,980 | 4/1999 | Butler ................................. 198/836.3 |
| 5,927,480 | 7/1999 | McCaffrey et al. ................. 198/836.3 |

FOREIGN PATENT DOCUMENTS

| | | |
|---|---|---|
| 335904 | 3/1959 | Sweden . |
| 489838 | 8/1938 | United Kingdom . |

*Primary Examiner*—Lynne H. Browne
*Assistant Examiner*—David E. Bochna
*Attorney, Agent, or Firm*—Knobbe, Martens, Olson & Bear, LLP

[57] ABSTRACT

A splice sleeve device provides for adjustable housing, gripping, and connecting of sequential guide rails. The device includes an elongated central member, a first and second tension bar located on opposite ends of the central member, and a first and second retention device to detachably secure the first and second tension bars to the central member, respectively. The dual retention device, accomplished by the first and second tension bars, allows a guide rail to be adjusted while the abutting sequential guide rail remains secure. In an additional embodiment, the sleeve is designed for use with a conveyor line having a radius turn. The sleeve has a shim that allows a guide rail to slide along a guide rail housing area when the guide rail housing area is tightened so as to adjust for gaps created in the arcuate conveyor line.

20 Claims, 10 Drawing Sheets

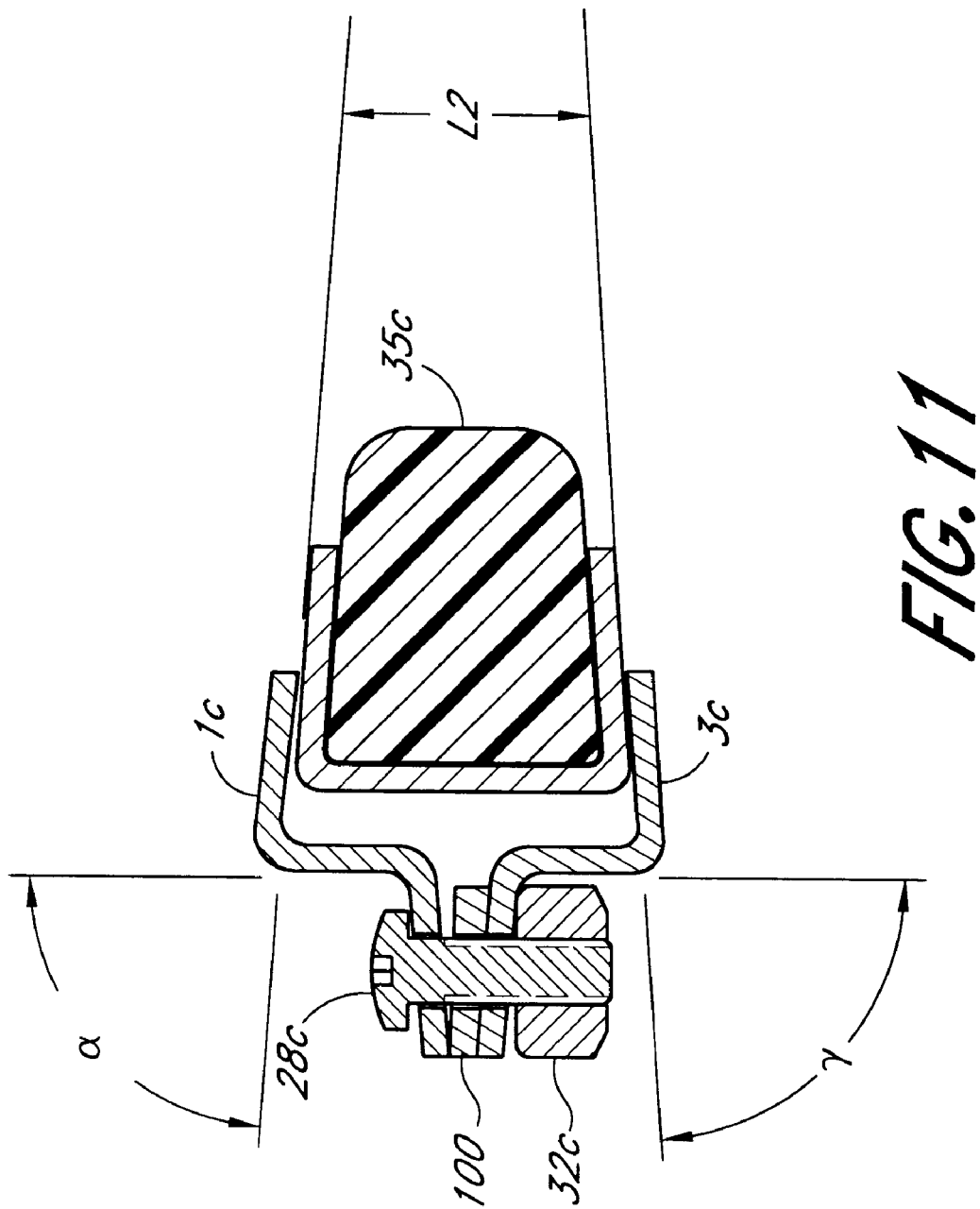

6,053,654

SPLICE SLEEVE FOR GUIDE RAILS

RELATED CASES

This application is a continuation-in-part of copending application Ser. No. 08/934,861, filed Sep. 22, 1997.

BACKGROUND OF THE INVENTION

1. Field of the Invention

The present invention relates in general to guide rail assemblies used in assembly line and conveyor belt systems and, in particular, to a means for adjustably housing, gripping and connecting sequential conveyor guide rails.

2. Description of the Related Art

Clamps are commonly used to grip and connect guide rails which direct the travel of articles along a predetermined path of an assembly line or conveyor system. The articles are conveyed on a belt or track during the processing and packaging procedures of a typical manufacturer. Dependable fixation and alignment of the guide rails is important to ensure manufacturing efficiency and to minimize damage of the articles from inappropriate contact with the guide rails. Guide rail length is customized to conveyor length by the sequential alignment and connection of guide rail segments.

Early guide rail housing, gripping, and connecting means were characterized by a cross bar that incorporated a clamping device, as illustrated in FIG. 1. Abutting guide rails were then connected and secured to the cross bar by the clamping device. Clips and other retention means were also used to secure abutting guide rails. An advantage of incorporating a clip with a nut and bolt clamping device is that the nut is more easily rotated onto the bolt without causing simultaneous rotation of the bolt. That is, integral bolts eliminate the need to grasp the bolt in order to prevent its rotation while rotating the nut into the bolt shaft. However, a disadvantage of clips formed with or without the bolt, is that they tend to rotate out of position about the pivot point formed by the bolt in the cross bar, thereby causing misalignment of the guide rail in the conveyor system.

Exemplary of a recent development in the guide rail housing, gripping and connecting field is illustrated in FIG. 2, which teaches a guide rail clamp comprising upper and lower L-shaped cross bars of equal length. The upper and lower cross bars are inversely aligned to form a C-shaped groove section wherein abutting guide rails are housed. The upper and lower cross bars are detachably connected by a nut and bolt retention device to allow adjustment of the guide rails.

However, the prior art devices all have significant deficiencies. Specifically, once abutting guide rail segments are connected, any subsequent alteration of either guide rail segment (due to setup, modification, replacement, etc.) is difficult because, when the retention means is loosened, both guide rail segments become loosened. This results in three loose parts. Therefore, the task of altering a guide rail segment requires either two operators or one operator with significant difficulty and awkwardness. A second problem with the prior art resulted because the abutting guide rail segments are secured on each end by only a single retention mechanism. Thus, whenever the single retention mechanism is loosened to alter a guide rail segment, the abutting rail segment is correspondingly loosened. A third problem with the prior art resulted from conveyor lines having radius turns. That is, when a conveyor line having a radius turn is outwardly adjusted, a gap is created commensurate with the radius arc length. This gap interrupts the close alignment of sequential guide rails and can cause articles to snag or be otherwise damaged when within the gap.

One of the primary factors which has inhibited the creation of a truly successful guide rail housing, gripping, connecting means has been the fixation of the prior art on securing the abutting ends of sequential guide rail segments with only a single retention device. It is this fixation on a single retention device that has restricted the art to inefficient and awkward designs.

SUMMARY OF THE INVENTION

A need therefore exists for a means for adjustably housing, gripping and connecting sequential guide rails that is easily adjustable and does not possess the disadvantages of the prior art. In accordance with one aspect of the present invention, the flanged splice sleeve device incorporates a dual retention means to overcome the deficiencies of the prior art by enabling a guide rail to be loosened while keeping the sequential guide rail secure.

In a preferred embodiment, the sleeve is comprised of an elongated central member, a first tension bar, a second tension bar, and two retention means to selectively adjust the respective tension bars and thereby tighten or loosen the corresponding guide rails. The first retention means is formed on the first end of the central member by aligning the first end of the central member with the first tension bar, to form a substantially C-shaped design. The channel created thereby houses a first guide rail. The second retention means is similarly formed on the second, opposite end of the central member by aligning the second end of the central member with the second tension bar, to form a substantially C-shaped design. The channel created thereby houses the second, abutting guide rail. Selective loosening or tightening of a first or second guide rail retention means thereby houses, grips, and sequentially connects a corresponding first or second guide rail.

An advantage of the dual retention means, accomplished by the first and second tension bars, is that only the one tension bar need be loosened in order to loosen the corresponding guide rail. The other tension bar is remains undisturbed and accordingly the other sequential guide rail remains undisturbed. This design enables a single operator to modify a guide rail without the above mentioned disadvantages inherent in the prior art. Moreover, a back flange provides additional mass in the direction of an applied force which further secures a guide rail.

An important optional embodiment of the sleeve incorporates a hand tightening device with ratcheting mechanism into the retention means so that the retention means may be tightened or loosened without the assistance of additional devices. A second optional embodiment involves an extension guide rail which may be placed between the first and second tension bars. This provides additional precision in the alignment of guide rails and further decreases the likelihood of inappropriate contact between the guide rails and articles being transported by the conveyor system.

In another preferred embodiment, the sleeve is comprised of an elongated central member having a guide rail housing portion and a support flange. A first tension bar having a guide rail housing portion and a supporting flange located adjacent a first end of the central member is arranged to form with the central member a first housing area for gripping a first guide rail. A second tension bar having a guide rail housing portion and a supporting flange located on a second end of the central member is arranged to form with the central member a second housing area for gripping a second guide rail. A retainer is used for clamping together the flanges of the central member and the first bar to secure the first guide rail within the first housing area. Another retainer is used for clamping together the flanges of the central member and the second bar for gripping a second guide rail within the second housing area. Also, an elongated shim is positioned between the flanges of the central member and the first tension bar to enlarge the first guide rail housing area so that the first guide rail is loosely gripped, but may be manually slid endwise within the first housing area.

Further advantages and applications will become apparent to those skilled in the art from the following detailed description and the drawings references herein.

BRIEF DESCRIPTION OF THE DRAWINGS

The above-mentioned and other features of the invention will now be described with reference to the drawings of a preferred embodiment of the present splice sleeve. The illustrated embodiments of the splice sleeve is intended to illustrate, but not to limit the invention. The drawings contain the following figures:

FIG. 11 is an assembled, end cross-sectional view of the components illustrated in FIG. 10.

DETAILED DESCRIPTION OF THE PREFERRED EMBODIMENT

Figure 1:
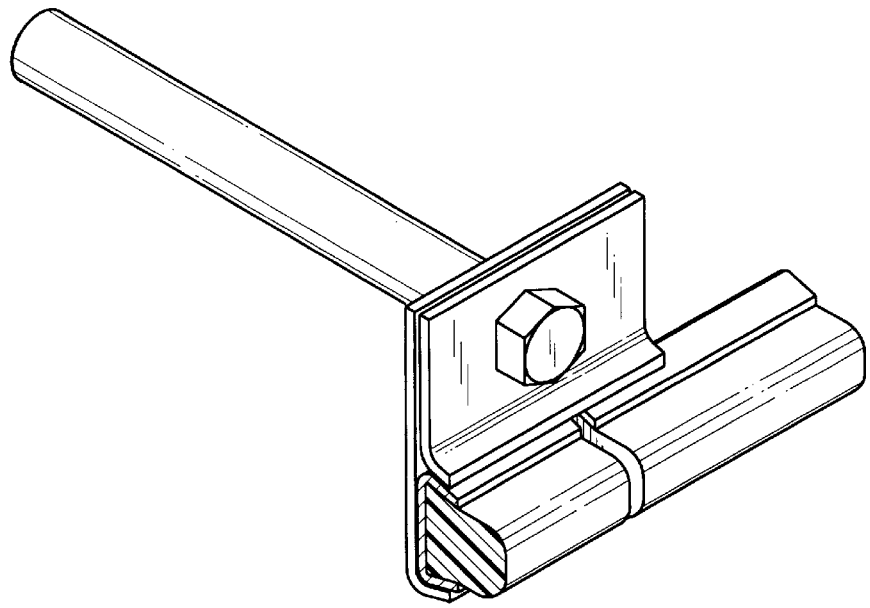
FIG. 1 is an isometric front view of a first prior art guide rail housing, gripping, and connecting means.
Figure 2:
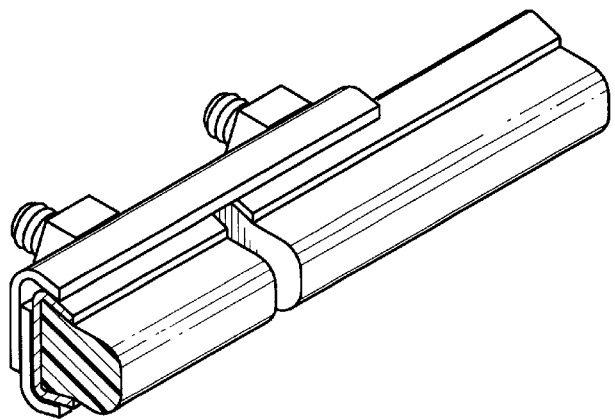
FIG. 2 is an isometric front view of a second prior art guide rail housing, gripping, and connecting means.
Figure 3:
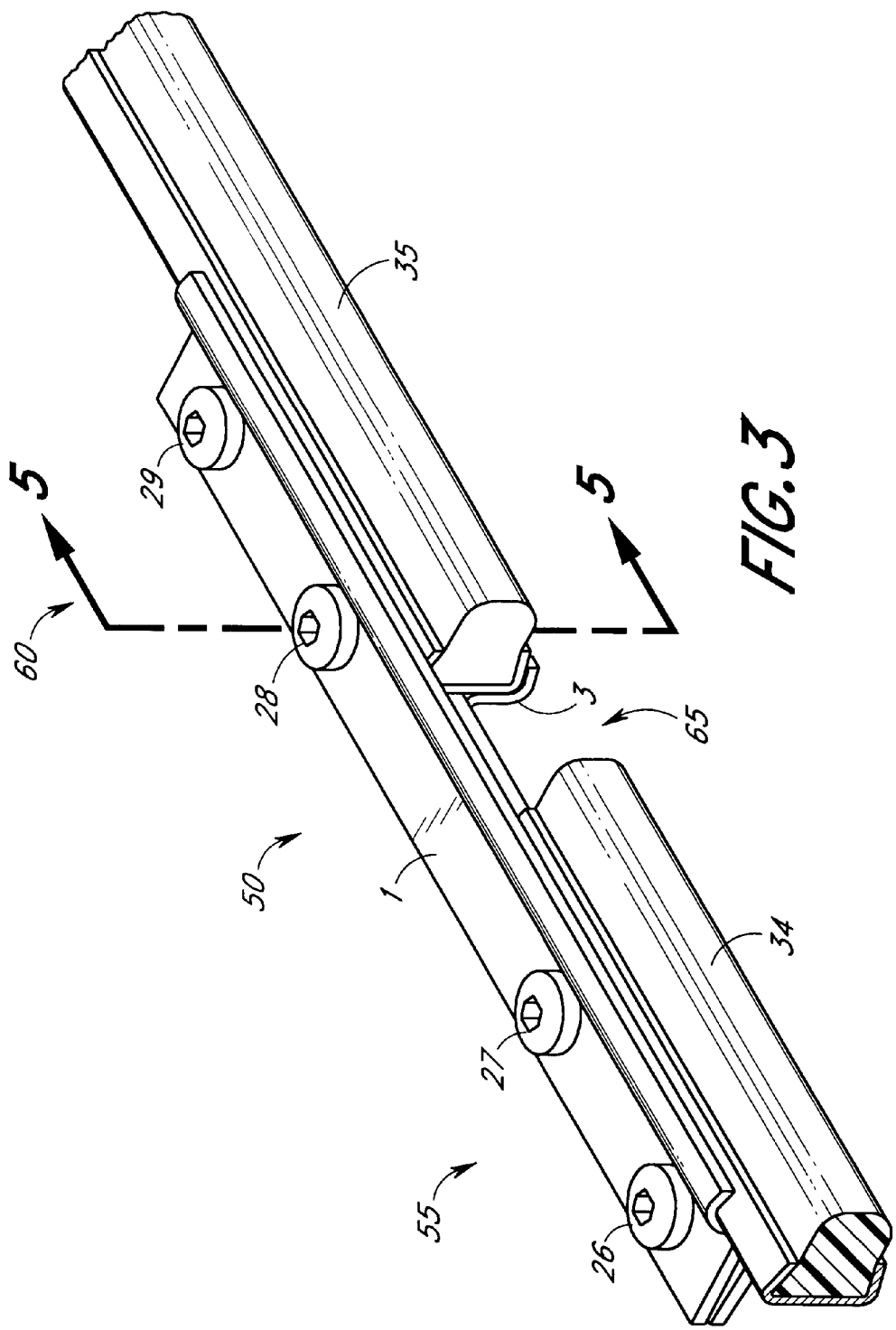
FIG. 3 is an isometric front view of a flanged splice sleeve constructed in accordance with the teachings of the invention as connected to sequential guide rail segments.
Figure 4:
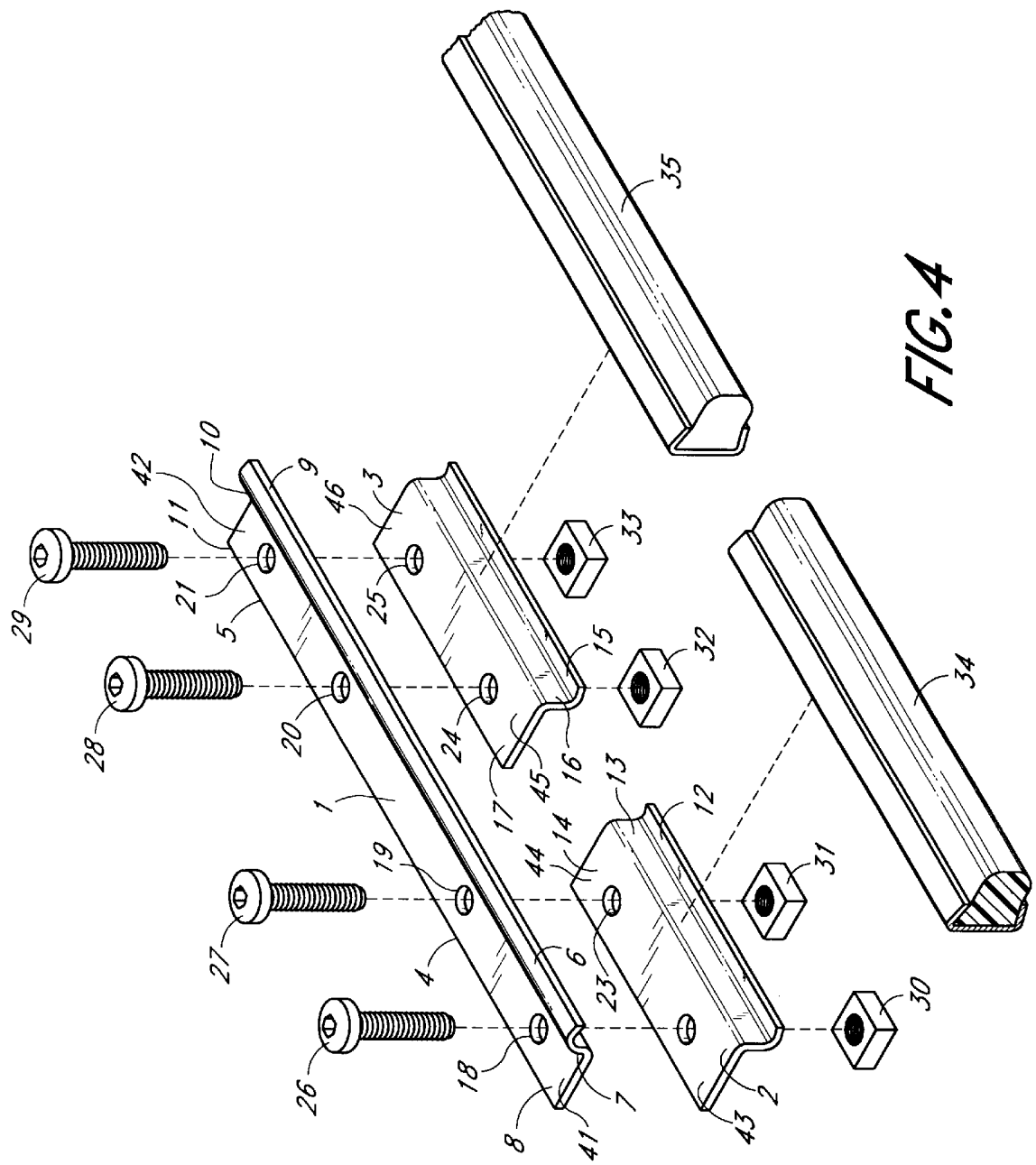
FIG. 4 is an exploded front view of the components illustrated in FIG. 3.

Referring to the drawings, and particularly to FIGS. 3 and 4 thereof, a guide rail splice sleeve is shown which includes an elongated central member 1, a first tension bar 2 located on a first end 4 of the central member 1, a second tension bar 3 located on a second, opposite end 5 of the central member 1, and two retention means which secure the tension bars 2,3 to the central member 1 as well as tighten or loosen corresponding guide rails 34,35 when placed between the central member 1 and tension bars 2,3.

The sleeve includes a unibody elongated central member 1. The central member 1 is constructed in a substantially stepped design, having a first or top section 6,9, and a downwardly extending second or vertical section 7,10, which forms half of a housing for receiving a guide rail. The member also includes a third or bottom section 8,11 forming a supporting flange for the housing. An angle α of approximately 80 degrees is formed between the top section 6,9 and the vertical section 7,10.

The sleeve includes a unibody first tension bar 2 constructed in a substantially stepped design, having a first or bottom section 12, and an upwardly extending second or vertical section 13 which forms the other half of the housing for receiving a guide rail. The bar also includes a third or top section 14 forming a support flange for the housing to be clamped to the flange 8,11 of the member 1. An angle β of approximately 80 degrees is formed between the bottom section 12 and the vertical section 13. The first tension bar 2 is less than one-half the length of the central member 1 and is located on the first end 4 of the central member 1. The extreme end of the first tension bar 2 and the extreme end of the first end 4 of the central member 1 both preferably terminate along the same plane, that is, both ends are flush. However, there is no requirement that the ends be flush.

The sleeve includes a second unibody tension bar 3 constructed in a similar manner as the first tension bar 2 to define a substantially stepped design, having a first or bottom section 15 and an upwardly extending second or vertical section 16, and a third or top section 17. An angle γ of approximately 80 degrees is formed between the bottom section 15 and the vertical section 16. The second tension bar 3 is less than one half the length of the central member 1 and is located on the second end 5 of the central member 1. The extreme end of the second tension bar 3 and the extreme end of the second end 5 of the central member 1 both preferably terminate along the same plane, that is, both ends are flush. However, there is no requirement that the ends be flush.

The first and second tension bars 2,3 are interchangeable and distinguished herein only for clarity purposes. Because the tension bars 2,3 are less than one half the length of the central member 1 and their ends preferably flushly terminate with the corresponding ends of the central member 1, a middle portion 65 (FIG. 7) preferably exists on the central member 1 where neither the first nor second tension bars 2,3 reach.

A first retention means is provided for detachably securing the first tension bar 2 to the first end 4 of the central member 1. Preferably, this means includes one or more fastening devices for engaging the first end 4 of the central member 1 with the first tension bar 2. This engagement is achieved by inversely aligning holes 18,19 that are located on the first end 4 of the central member 1 with holes 22,23 that are located on the first tension bar 2. The central member incorporates four cylindrical holes 18,19,20,21, two adjacent to the first end 18,19 and two adjacent to the second end 20,21. The first tension bar 2 incorporates two adjacent cylindrical holes 22,23 on the top section 14. When the holes 18,19 located on the first end 4 of the central member 1 are aligned with the holes 22,23 on the first tension bar 2, a fastening device 26,27 is then inserted through the holes 18,19,22,23. When fastened, the extreme end of the first end 4 of the central member 1 and the extreme end of the first tension bar 2 preferably remain flush.

A second retention means is similarly provided for detachably securing the second tension bar 3 to the second end 5 of the central member 1. Preferably, this means includes one or more fastening devices for engaging the second end 5 of the central member 1 with the second tension bar 3. This engagement is achieved by inversely aligning holes 20,21 that are located on the second end 5 of the central member 1 with holes 24,25 that are located on the second tension bar 3. The second tension bar 3 incorporates two adjacent cylindrical holes 24,25 on the top section 17. When the holes 20,21 located on the second end 5 of the central member 1 are aligned with the holes 24,25 on the second tension bar 3, a fastening device 28,29 is then inserted through the holes 20,21,24,25. When fastened, the extreme end of the second end 5 of the central member 1 and the extreme end of the second tension bar 3 remain flush.

Figure 7:
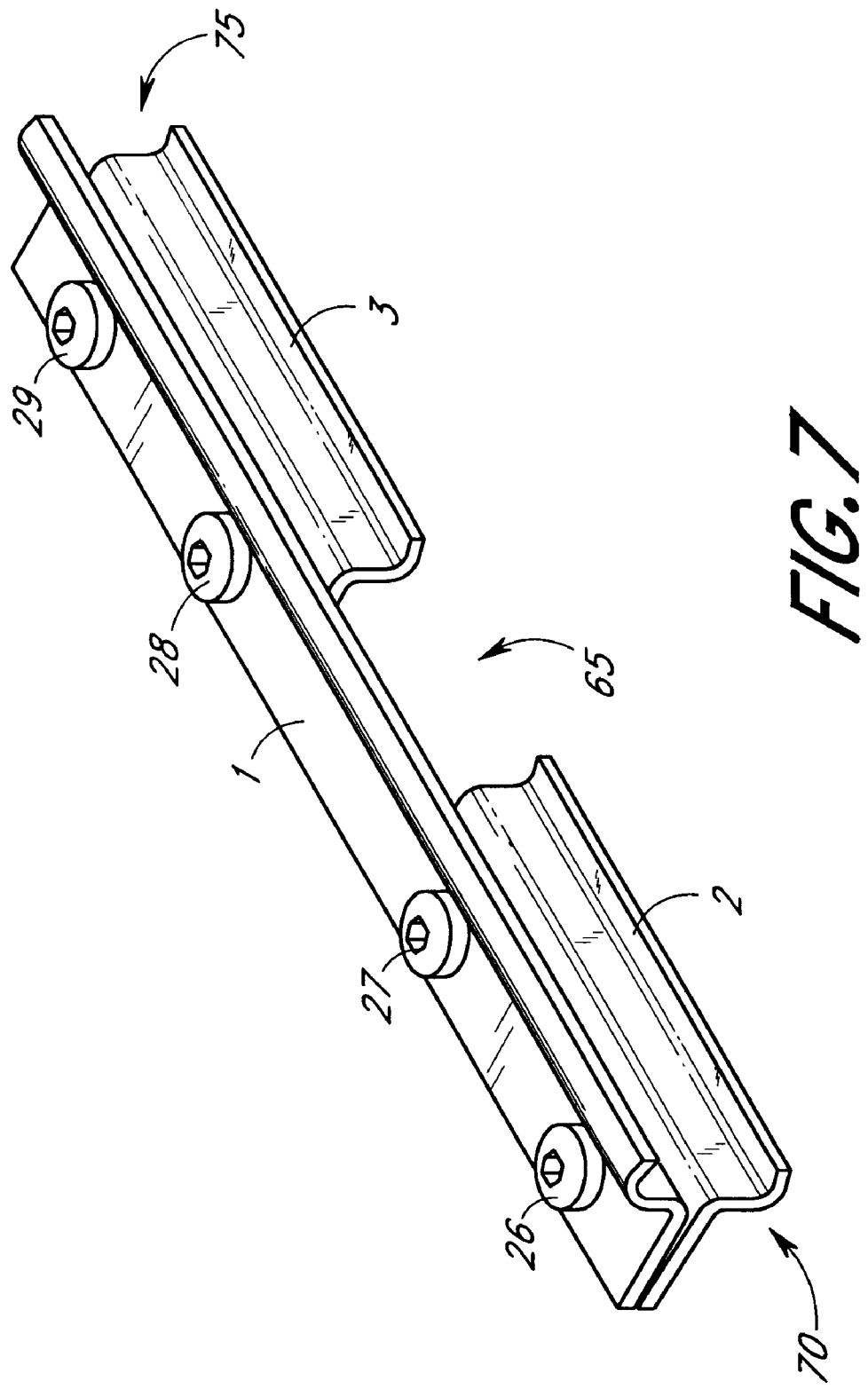
FIG. 7 is an isometric front view of the components illustrated in FIG. 3 prior to the introduction of the guide rails.

Referring to FIGS. 4 and 7, a first guide rail housing area 70 is formed by fastening the first end 4 of the central member 1 to the first tension bar 2 as described above. So arranged, these members define a substantially C-shaped housing area having a length L1 and characterized by a 80 degree angle α between the top section 6 and downwardly extending vertical section 7 of the on first end 4 of the central member 1 and an 80 degree angle β between the bottom section 12 and upwardly extending vertical section 13 of the first tension bar 2. More specifically, the top section of the housing area 70 is formed by the top section 6 of the first end 4 of the central member 1, the bottom section of the housing area 70 is formed by the bottom section 12 of the first tension bar 2, and the vertical section of the housing area 70 is formed by the abutting downwardly extending vertical section 7 of the first end of the central member 1 and the upwardly extending vertical section 13 of the first tension bar 2. This arrangement also defines a back flange area formed by the bottom section 8 of the first end 4 of the central member 1 and the top section 14 of the first tension bar 2. The channel formed thereby houses the first guide rail 34.

A second guide rail housing area 75 is similarly formed by fastening the second end 5 of the central member 1 to the second tension bar 3. So arranged, these members define a substantially C-shaped housing area having a length L2 and characterized by a 90 degree angle α between the top section 9 and downwardly extending vertical section 10 of the second end 5 of the central member 1 and an 80 degree angle γ between the bottom section 15 and upwardly extending vertical section 16 of the second tension bar 3. More specifically, the top section of the housing area 75 is formed by the top section 9 of the second end 5 of the central member 1, the bottom section of the housing area 75 is formed by the bottom section 15 of the second tension bar 3, and the vertical section of the housing area 75 is formed by the abutting downwardly extending vertical section 10 of the second end 5 of the central member 1 and the upwardly extending vertical section 16 of the second tension bar 3. This arrangement also defines a back flange area formed by the bottom section 11 of the second end 5 of the central member 1 and the top section 17 of the second tension bar 3. The channel formed thereby houses the second guide rail 35. Preferably, the first guide rail housing area length L1 is approximately equal to the second guide rail housing area length L2.

As stated above, two retention means are provided for detachably securing the first and second tension bars 2,3 to the respective ends 4,5 of the central member 1. When tightened, the retention means also acts on the guide rail housing area to grip and secure guide rail segments 34,35. This gripping ability is formed within the housing area. Preferably, a conventional nut and bolt device affords variable tightening or loosening of the gripping ability. More specifically, the preferred embodiment depicts a bolt 26,27, 28,29 which is readily inserted through the flange section 8,11,14,17 of the guide rail housing area. A nut 30,31,32,33 is then threaded through the bolt 26,27,28,29 and urges on the flange section 8,11,14,17 of the guide rail housing area, providing an inwardly directed force onto the top 6,9, bottom 12,15 and vertical surfaces 7,10,13,16 of the guide rail housing area. This force secures a guide rail 34,35 when accepted into the guide rail housing area. Selective tightening or loosening of the nut and bolt fastening device accordingly grips or releases the guide rail 34,35. Preferably, the inwardly directed force applied to the guide rails 34,35 is sufficient to prevent or inhibit the guide rails 34,35 from sliding within the respective guide rail housing areas 70,75 when the guide rail housing areas 70,75 are tightened and a force applied by person's bare hand is directed onto the guide rails 34,35.

Figure 6:
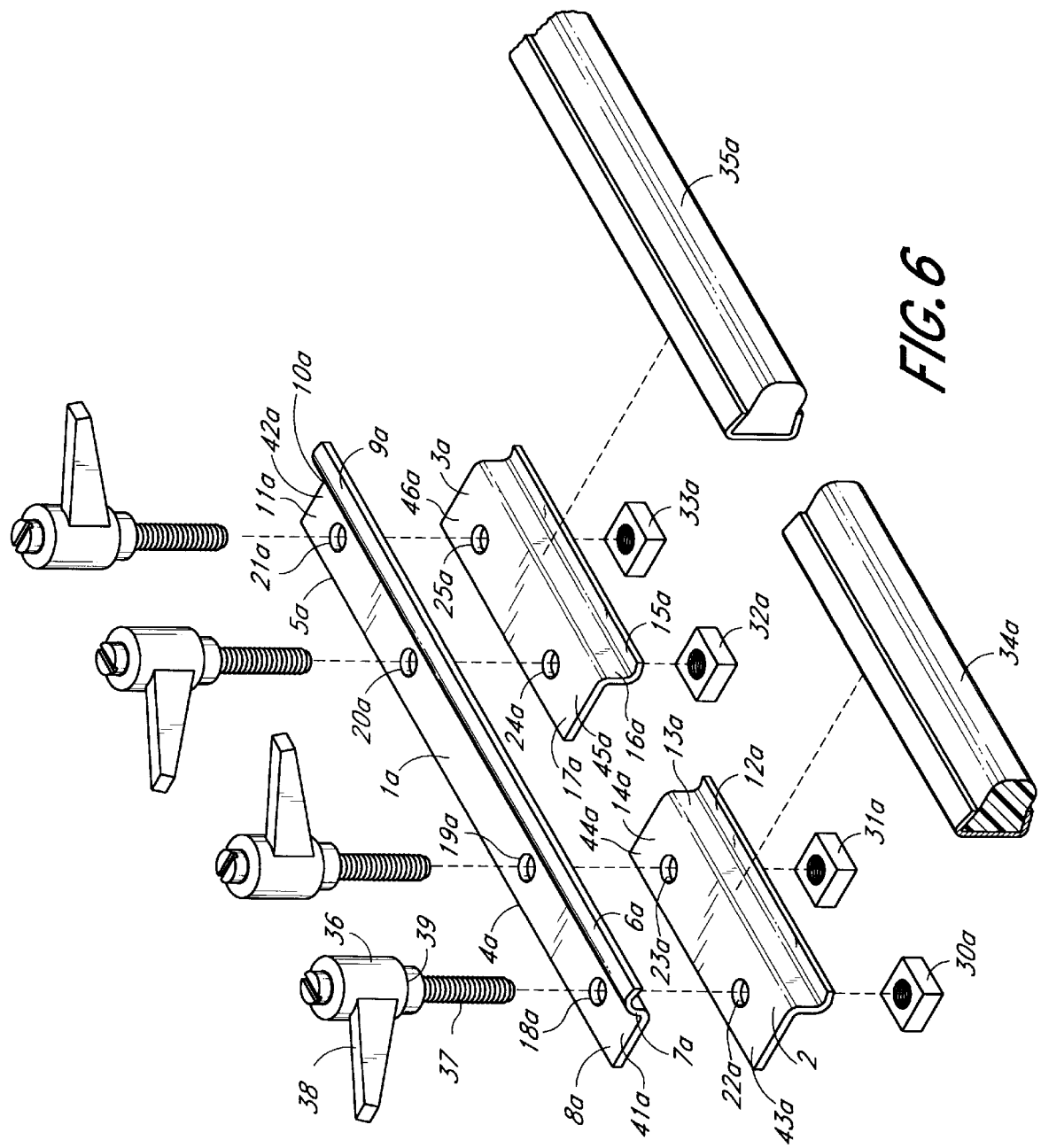
FIG. 6 is an exploded front view of the components illustrated in FIG. 4 incorporating a hand tightening device.

In accordance with a second embodiment of the present invention, and referring to FIG. 6, the sleeve incorporates a hand tightening device 36 into the retention means. Like the other embodiments of the splice sleeve, this embodiment includes an elongated central member, first and second tension bars, and first and second retention means to easily and adjustably house, grip and connect sequential guide rails. For consistency, like numbers with an "a" suffix have been used to indicate like parts of the splice sleeve of FIG. 6. The above description of like components thus should be understood as applying equally to this embodiment, unless stated otherwise.

The hand tightening device 36 is constructed of unibody molded plastic and comprises a bolt portion 37 and a handle portion 38. The bolt portion 37 is inserted through the flange section 8a,14a of the guide rail housing area. A nut 30a threadingly engages with the bolt portion 37 to form a conventional nut and bolt device. That is, clockwise rotation of the bolt portion 37 urges the device 36 toward the nut 30a, thereby tightening the retention means, and counterclockwise rotation of the bolt portion 37 urges the device 36 away from the nut 30a, thereby loosening the retention means. The handle portion 38 partially houses the bolt portion 37 and extends radially to form a handle by which an operator may grip and rotate the device 36. A ratchet mechanism 39 lies between the bolt portion 37 and the handle portion 38 to allow rotation of the device 36 in confined areas.

Figure 8:
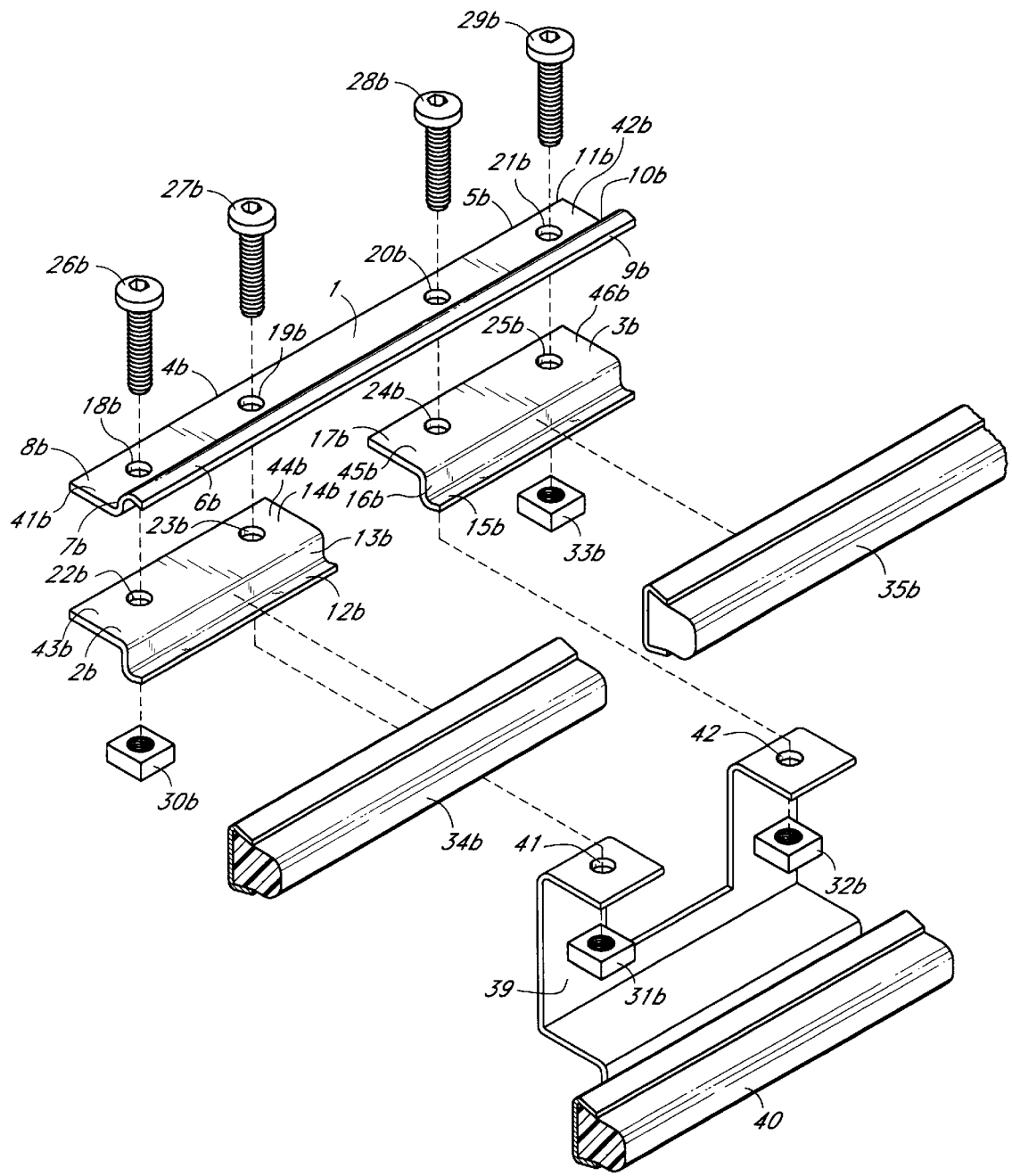
FIG. 8 is an exploded front view of the components illustrated in FIG. 4 incorporating an extension guide rail.
Figure 9:
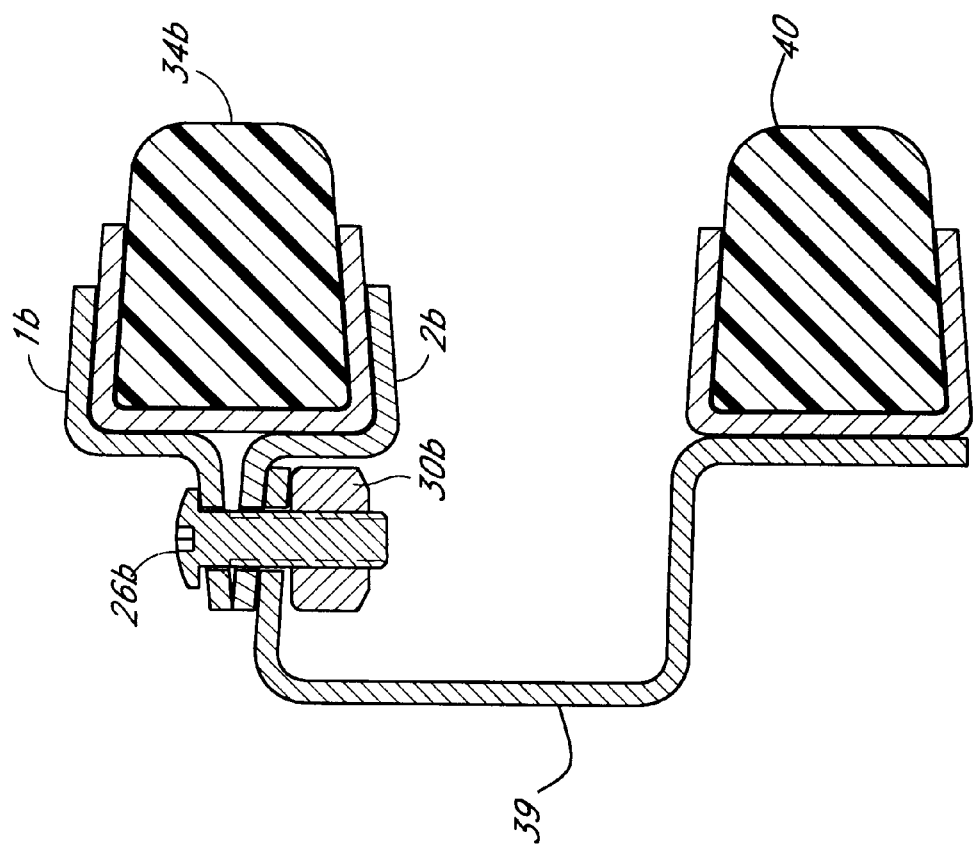
FIG. 9 is a side view of the components illustrated in FIG. 8.

A third embodiment, illustrated in FIGS. 8 and 9, incorporates an extension guide rail 40 which is placed between the first and second tension bars 2b,3b and attached to the central member 1b. Like the other embodiments of the splice sleeve, this embodiment includes an elongated central member, first and second tension bars, and first and second retention means to easily and adjustably house, grip and connect sequential guide rails. For consistency, like numbers with a "b" suffix have been used to indicate like parts of the splice sleeve of FIG. 6. The above description of like components thus should be understood as applying equally to this embodiment, unless stated otherwise.

Attachment to the central member 1b is accomplished by holes 41,42 which align with the interior holes 19b,20b on the central member 1b. When aligned, a bolt 27b,28b is inserted through the holes 19b,20b,41,42 to secure the extension guide rail 40 beneath the sleeve by an extension member 39. The extension guide rail 40 provides additional precision in the alignment of guide rails 34b,35b and decreases the likelihood of inappropriate contact between the guide rails 34b,35b and articles being transported by the conveyor system.

Figure 10:
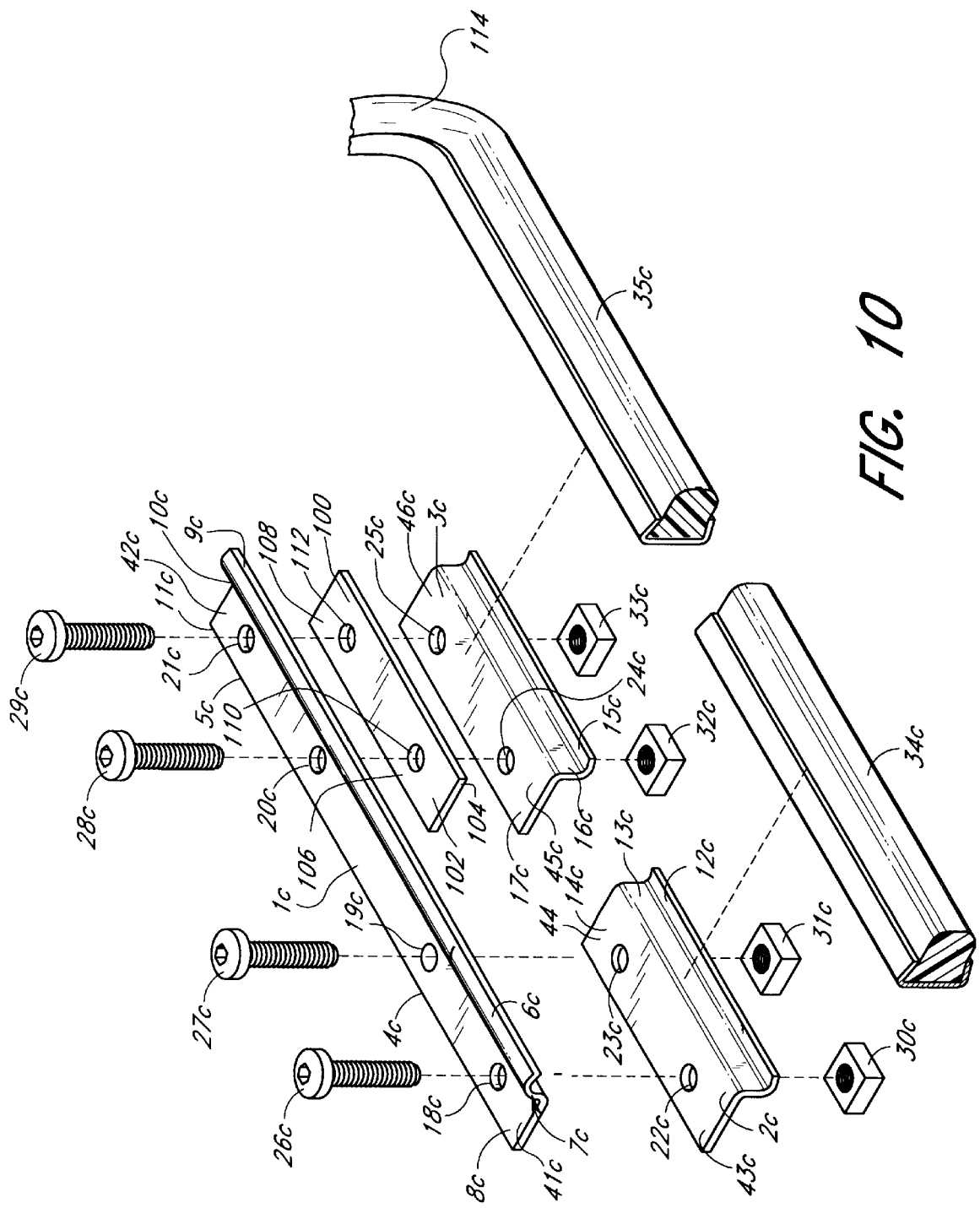
FIG. 10 is an exploded front elevation view of the components illustrated in FIG. 4 incorporating a shim.

A fourth embodiment, illustrated in FIGS. 10 and 11, incorporates a shim 100 between the elongated central member 1c and the second tension bar 3c. Like the other embodiments of the splice sleeve, this embodiment includes an elongated central member 1c, first and second tension bars 2c,3c, and first and second retention means to easily and adjustably house, grip and connect sequential guide rails. Again, for consistency, like numbers with a "c" suffix have been used to indicate like parts of the splice sleeve of FIG. 6. The above description of like components thus should be understood as applying equally to this embodiment, unless stated otherwise.

An exemplary environment in which the splice sleeve of the present embodiment may be used includes a conveyor line having a radius turn (not shown). When a conveyor line having a radius turn is outwardly adjusted, a gap is created commensurate with the radius arc length. This gap interrupts the sequential alignment of the guide rails, which may have a curved portion 114, and can cause articles to snag or be damaged when within the gap. Similarly, when a conveyor line having a radius turn is inwardly adjusted, unless a gap exists between sequential guide rails before such inward adjustment, the guide rails may overlap and thus aggravate the desired smooth, flush guide surface.

As shown in FIG. 10, a body or shim 100 is constructed with an elongated generally rectangular configuration having an upper surface 102 and a lower surface 104, and a first end 106 and a second end 108. A first hole 110 is located on the shim 100 toward the first end 106 and extends from the first surface 102 to the second surface 104. Similarly, a second hole 112 is located on the shim 100 toward the second end 108 and extends from the first surface 102 to the second surface 104.

The shim 100 is preferably less than one-half the length of the central member 1c and can be located on either the first end 4c of the central member 1c or the second end 5c of the central member 3c. The illustrated embodiment shows the shim 100 on the second end 5c of the central member 3c. The extreme ends of the shim 100, second tension bar 3c and second end 5c of the central member 1c all preferably terminate along the same plane, that is, all ends are flush. However, there is no requirement for the ends to be flush.

Figure 5:
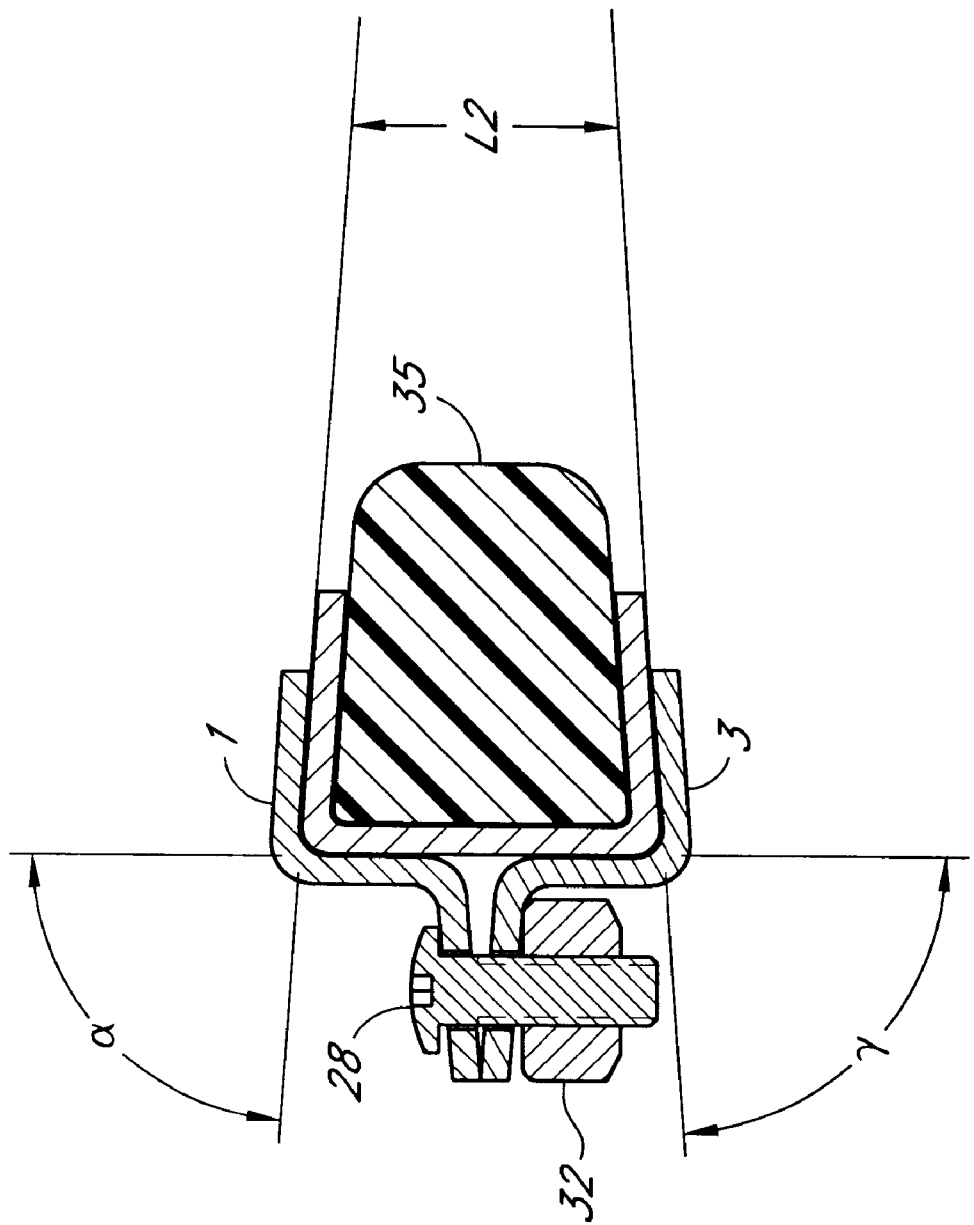
FIG. 5 is an assembled, cross-sectional view of the components illustrated in FIG. 3.

When placed between the central member 1c and second tension bar 3c, the shim 100 has a thickness that fills a space such that the second guide rail housing area 75 (FIG. 5) has a length L2' (FIG. 11) that is larger than the length L1 of the first guide rail housing area.

As best illustrated in FIG. 11, this lengthened relationship of the second guide rail housing area 75c causes the inwardly directed force, which is applied to the second guide rail 35c by tightening the nut and bolt as described above, to be less than the inwardly directed force applied to the first guide rail housing area 70c which has the smaller length L1. Thus, the second guide rail 35c is less tightly secured within the second guide rail housing area 75c than is the first guide rail 34c within the first guide rail housing area 70c, when the respective retention means are tightened. Preferably, the inwardly directed force applied to the second guide rail 35c, is sufficient to prevent or inhibit the second guide rail 35c from sliding within the second guide rail housing area 75c, but insufficient to prevent or inhibit the second guide rail 35c from sliding within the second guide rail housing area 75c, when a person's hand pressure is applied to the second guide rail 35c and the second guide rail housing area is tightened by the second retention means.

By this arrangement, with the shim 100 in place and both retention means tightened, the second guide rail 35c may be readily moved or horizontally slid within the second guide rail housing area 75c to adjust for gaps caused by conveyor lines with one or more radius turns. Meanwhile, the first guide rail 34c can remain fixed and inhibited from sliding unless the first tightening means is loosened. With the shim 100 in place, the second guide rail 35c can be moved or slid up to a length equal to the length of the second tension bar 35c.

The shim 100 can be easily interchanged between tension bars 2c, 3c. Thus, the shim 100 can be similarly used between either the second tension bar 3c and the central member 1c, as described above, or between the first tension bar 2c and the central member 1c, or two shims 100 can be used, one between the first tension bar 2c and the central member 1c, and the other between the second tension bar 3c and the central member 1c.

In the illustrated embodiments, the members 1,2,3,100 are all constructed of stainless steel. Stainless steel was chosen for its strength, low cost, and cleanability, which are commonly required of guide rail mounting devices used in assembly line operations. The ability to be easily cleaned becomes especially important when the sleeve is used in food preparation situations. Moreover, stainless steel can be polished to a smooth surface. However, there is no requirement that stainless steel be used. Rather, other metals, plastics, composites, or other similar materials may be used depending on the requirements which are demanded of the sleeve.

In the illustrated embodiments, the central member 1 is approximately eight inches in length, with a top section 6,9 width of approximately three eighths of an inch, a downwardly extending vertical section 7,10 width of approximately one quarter of an inch, and a bottom section 8,11 width of approximately one half of an inch. The first and second tension bars 2,3 are both approximately three inches in length with a bottom section 12,15 width of approximately three eighths of an inch, an upwardly extending vertical section 13,16 width of approximately one quarter of an inch, and a top section 14,17 width of approximately one half of an inch. The holes 18,19,20,21,22,23,24,25,110,112 located on the central member 1 and first and second tension bars 2,3 and shim 100 (if used) are approximately three eighths of an inch in diameter. The nut 30,31,32,33 and bolt 26,27,28,29 are also approximately three eighths of an inch in diameter and of conventional design. The shim 100 (if used) is approximately three inches in length with a width of approximately three eighths of an inch, and has a thickness that can range between approximately one sixteenth of an inch to approximately one inch. However, there is no requirement regarding these specifications and should be varied based upon the specific application of the sleeve. These specifications are only designed to provide greater detail to the preferred embodiments.

The embodiments illustrated and described above are provided merely as examples of the flange splice sleeve constructed in accordance with the present invention. Other changes and modifications can be made from the embodiments presented herein by those skilled in the art without departure from the spirit and scope of the invention, as defined by the appended claims.

What is claimed is:

1. A splice sleeve for housing, gripping, and connecting sequential guide rails to a conveyor line having a radius turn, comprising:
    an elongated central member having a guide rail housing portion and a support flange;
    a first tension bar having a guide rail housing portion and a supporting flange, the bar being located adjacent a first end of the central member and arranged to form with the central member a first housing area for gripping a first guide rail;

a second tension bar having a guide rail housing portion and a supporting flange, the second bar being located on a second end of the central member to form with the central member a second housing area for gripping a second guide rail;

a retainer for clamping together the flanges of the central member and the first bar to secure the first guide rail within the first housing area;

a retainer for clamping together the flanges of the central member and the second bar for gripping a second guide rail within the second housing area; and an elongated shim to be positioned between the flanges of the central member and said first tension bar to enlarge the first guide rail housing area so that the first guide rail can be loosely gripped, but may be manually slid endwise within the first housing area.

2. A splice sleeve as claimed in claim 1, wherein the second length of the second guide rail housing is greater than the first length of the first guide rail housing.

3. A splice sleeve as claimed in claim 1, wherein the first guide rail is adapted to be flush fixed within the first guide rail housing area and cannot be slid by a force applied by a person's bare hand.

4. A splice sleeve as claimed in claim 1, wherein the second guide rail is fixed within the second guide rail housing area and can be slid by a force applied by a person's bare hand.

5. A splice sleeve as claimed in claim 1, wherein the first and second retainers further comprise hand tightening devices to allow hand adjustability of the retainers.

6. A splice sleeve as claimed in claim 1, wherein an extension guide rail is located between the first tension bar and the second tension bar.

7. A splice sleeve as claimed in claim 1, wherein the shim has a thickness of approximately one sixteenth of an inch.

8. A splice sleeve as claimed in claim 1 wherein the shim has a thickness of approximately one inch.

9. A splice sleeve as claimed in claim 1, wherein the shim includes a first hole and a second hole formed on opposing ends of the shim.

10. A splice sleeve as claimed in claim 9, wherein the first and second holes of the shim are respectively symmetrically located with a first hole and a second hole formed on the central member and a first hole and a second hole formed on the second tension bar.

11. A splice sleeve as claimed in claim 10, wherein the second retainer comprises a pair of bolts which respectively extend through the holes in central member and through the holes in the shim and then through the holes in the second tension bar and are secured by a pair of bolts.

12. A splice sleeve as claimed in claim 1, wherein the first retainer comprises a pair of bolts which respectively extend through a third and fourth hole in central member and through a first and second hole in the second tension bar and are secured by a pair of bolts.

13. A splice sleeve as claimed in claim 1, wherein the shim can be interchanged between the first and second guide rail housing areas.

14. A splice sleeve comprising a C-shaped guide rail channel formed by an elongated central member and a tension bar for gripping a guide rail to a conveyor line having a radius turn, said bar and said central member having supporting flanges each with a hole therethrough; and an elongated shim having a hole, the shim being arranged between the central member and the tension bar flanges such that the holes in the shim, central member and tension bar align to allow a retainer to be placed therethrough such that the guide rail channel can retain the guide rail when the retainer is fully tightened but the guide rail can be slid endwise within the guide rail channel by a force applied by a person's bare hand.

15. A splice sleeve as claimed in claim 14, wherein the shim has a unibody construction.

16. A splice sleeve as claimed in claim 14, wherein the shim thickness is approximately one sixteenth of an inch.

17. A shim as claimed in claim 14, wherein the shim has a length that is less than one-half the length of the central member.

18. A shim as claimed in claim 14, wherein an end of the shim is aligned flush with an end of the central member and an end of the tension bar.

19. A shim as claimed in claim 14 wherein the guide rail is adapted to slides in a direction parallel to the guide rail housing area.

20. A method for housing, gripping, and connecting sequential guide rails for use with a conveyor system having a radius turn, comprising:

forming a first guide rail housing area by arranging a central member and a first tension bar in a generally C-shaped orientation;

placing a first guide rail within said first guide rail housing area;

securing the first guide rail within the first guide rail housing area with a first retention means;

forming a second guide rail housing area by arranging the central member and a second tension bar in a generally C-shaped orientation with a shim placed between the central member and the second tension bar;

placing a second guide rail within said second guide rail housing area; and securing the second guide rail within the second guide rail housing area with a second retention means.

* * * * *

UNITED STATES PATENT AND TRADEMARK OFFICE
CERTIFICATE OF CORRECTION

PATENT NO.   : 6,053,654
DATED        : April 25, 2000
INVENTOR(S)  : Stuart J. Ledingham It is certified that error appears in the above-identified patent and that said Letters Patent is hereby corrected as shown below:

Column 9,
Line 22, please delete "flush"
Line 26, please insert the phrase -- adapted to be -- between the words "is" and "fixed".

Column 10,
Line 31, please delete "slides" and replace it with -- slide --.

Signed and Sealed this

Tenth Day of September, 2002

Attest:

Attesting Officer

JAMES E. ROGAN
Director of the United States Patent and Trademark Office